United States Patent [19]

Tsukamoto

[11] Patent Number: 4,834,313
[45] Date of Patent: May 30, 1989

[54] EMERGENCY LOCKING RETRACTOR

[75] Inventor: Masahiro Tsukamoto, Fujisawa, Japan

[73] Assignee: Nippon Seiko Kabushiki Kaisha Corp., Tokyo, Japan

[21] Appl. No.: 128,177

[22] Filed: Dec. 3, 1987

[30] Foreign Application Priority Data

Dec. 4, 1986 [JP] Japan .................. 61-186121

[51] Int. Cl.$^4$ ................. B60R 22/38; B60R 22/40
[52] U.S. Cl. .................. 242/107.4 A; 242/107.4 B; 242/107.4 C
[58] Field of Search ............. 242/107.4 A, 107.4 B, 242/107.4 C; 280/806; 297/478

[56] References Cited

U.S. PATENT DOCUMENTS

| | | | |
|---|---|---|---|
| 4,470,557 | 9/1984 | Ernst | 242/107.4 C X |
| 4,506,844 | 4/1985 | Ernst | 242/107.4 A |
| 4,509,707 | 4/1985 | Ernst et al. | 242/107.4 C X |
| 4,522,350 | 6/1985 | Ernst | 242/107.4 A |

Primary Examiner—John M. Jillions
Attorney, Agent, or Firm—Wegner & Bretschneider

[57] ABSTRACT

An emergency locking retractor is constructed of a base having an engaged portion; a take-up spindle supported displaceably in a direction perpendicular to the longitudinal central axis thereof; a movable member supported rotatably about the spindle; a holder for normally holding the movable member unrotatably; a clutch mechanism for connecting the spindle and the movable member to each other when the spindle undergoes a rotational speed change; a ratchet member provided as a unitary member with the spindle, said ratchet member being engageable with the engaged portion to prevent any further rotation of the spindle when a tensile force is applied to the spindle and the spindle is displaced in the direction perpendicular to the longitudinal central axis thereof; and a clutch mechanism releasing device for causing the movable member to turn in a webbing-releasing direction when the ratchet member and engaged portion are in mutual engagement.

20 Claims, 12 Drawing Sheets

EMERGENCY LOCKING RETRACTOR

BACKGROUND OF THE INVENTION

1. Field of the Invention:

This invention relates to an emergency locking retractor which can be released from lockup. By the term "lockup" as used herein is meant a phenomenon or situation in which subsequent to full take-up of a webbing, a take-up spindle for the webbing can still rotate slightly in a webbing-releasing direction but the locking of the take-up spindle cannot be released by the slight rotation of the take-up spindle in the webbing-releasing direction.

2. Description of Related Art:

Emergency locking retractors known to date have an inertia member. When the inertia member is delayed in rotation relative to its associated take-up spindle, the take-up spindle and a force-transmitting member are connected to each other by means of a clutch means and the force-transmitting member hence rotates together with the take-up spindle in a webbing-releasing direction. A cam portion of the force-transmitting member then acts on a driven portion of a pawl member to bring the pawl member into engagement with a ratchet means provided integrally with the take-up spindle, so that any further rotation of the take-up spindle in the webbing releasing direction is locked.

In such retractors, the force-transmitting member is rotated together with the take-up spindle, namely, with the ratchet means in the webbing-releasing direction by means of the clutch means. The pawl member is hence brought into a locking state in which the pawl member is brought into engagement with any one of teeth of the ratchet means by the cam mechanism. The pawl member can hence be brought into a locking state in synchronization with the rotation of the ratchet means. It is therefore possible to avoid the so-called jumping phenomenon that the edge of the pawl member is hit back by the teeth of the ratchet means and the intended engagement between the pawl member and any one of the teeth of the ratchet means cannot be achieved smoothly.

However, the clutch means is connected making use of an inertia force of an inertia member when a rotational offset occurs between the inertia member and the take-up spindle. As a result, the force-transmitting member rotates together with the take-up spindle to bring the pawl member into engagement with the ratchet means. Upon occurrence of the situation in which an inertia force is applied, the rotation of the take-up spindle in the webbing-releasing direction is locked through such a course of operation as described above even when no emergency situation exists and the locking of the take-up spindle is hence unnecessary.

When the webbing is taken up rapidly over the entire length thereof from a released state by the spring force of a take-up spring, the take-up spindle is abruptly stopped upon completion of tightening of the thus-wound webbing but the inertia member is allowed to rotate continuously owing to its inertia force. The inertia member thus undergoes a rotational offset relative to the take-up spindle, whereby the clutch means is brought into a connected state. The take-up spindle then begins to rotate in the webbing-releasing direction as a reaction. Accordingly, the force-transmitting member starts rotating in the webbing-releasing direction together with the take-up spindle via the clutch means which is in such a connected state as described above.

Rotation of the force-transmitting member hence brings the pawl member into a state where it is engageable with the ratchet means. As a result, the take-up spindle becomes no longer rotatable in the webbing-releasing direction once the ratchet means engages the pawl member. Since the webbing is in a fully-wound state here, the take-up spindle cannot rotate in the webbing-winding direction either. The webbing can thereafter be released and taken up only within a narrow range between a state, in which the pawl member is engageable with the ratchet means as described above, and another state in which the pawl member is actually brought into engagement with the ratchet means. Neither release nor winding of the webbing hence becomes feasible as a matter of fact, so that the retractor goes into the so-called lockup state.

SUMMARY OF THE INVENTION

With the foregoing in view, the present invention has as a principal object the provision of an emergency locking retractor which has a simple structure and permits release of such a lockup state as that mentioned above even when the lockup state occurs.

In one aspect of this invention, there is thus provided an emergency locking retractor comprising:

a base having an engaged portion;

a take-up spindle supported rotatably and displaceably in a direction perpendicular to the longitudinal central axis thereof on the base, said spindle being biased in a webbing-winding direction;

a movable member supported rotatably about the take-up spindle;

a holding means for normally holding the movable member unrotatably;

a clutch mechanism for connecting the take-up spindle and movable member to each other when the take-up spindle undergoes a rotational speed change of at least a predetermined value;

a ratchet means provided as a unitary member with the take-up spindle, said ratchet means being engageable with the engaged portion to prevent any further rotation of the take-up spindle when a tensile force of at least a predetermined value is applied to the take-up spindle and the take-up spindle is displaced in the direction perpendicular to the longitudinal central axis thereof; and a clutch mechanism releasing means for causing the movable member to turn in a webbing-releasing direction when the ratchet means and engaged portion are in mutual engagement.

In another aspect of this invention, there is also provided an emergency locking retractor comprising:

a base having an engaged portion;

a take-up spindle supported rotatably and displaceably in a direction perpendicular to the longitudinal central axis thereof on the base, said spindle being biased in a webbing-winding direction;

a movable member supported rotatably about the take-up spindle;

a holding means for normally holding the movable member unrotatably;

a ratchet wheel which is loose-fit on the take-up spindle but is normally rotatable together with the take-up spindle;

a sensor means operable upon sensing a speed change of at least a predetermined value applied to the base, thereby engaging the ratchet wheel to prevent any further rotation of the ratchet wheel;

a clutch mechanism for connecting the take-up spindle and movable member to each other when a rotational phase difference occurs between the ratchet wheel and the take-up spindle;

a ratchet means provided as a unitary member with the take-up spindle, said ratchet means being engageable with the engaged portion to prevent any further rotation of the take-up spindle when a tensile force of at least a predetermined value is applied to the take-up spindle and the take-up spindle is displaced in the direction perpendicular to the longitudinal central axis thereof; and a clutch mechanism releasing means for causing the movable member to turn in a webbing-releasing direction when the ratchet means and engaged portion are in mutual engagement.

In a further aspect of this invention, there is also provided an emergency locking retractor comprising:

a base having an engaged portion;

a take-up spindle supported rotatably and displaceably in a direction perpendicular to the longitudinal central axis thereof on the base, said spindle being biased in a webbing-winding direction;

a wheel loose-fit on the take-up spindle;

a means for causing the wheel to rotate together with the take-up spindle normally;

a rotation preventing means adapted to be connected to the base when a rotational phase difference occurs between the take-up spindle and the wheel, whereby any further rotation of the take-up spindle is prevented;

a ratchet means provided as a unitary member with the take-up spindle, said ratchet means being engageable with the engaged portion to prevent any further rotation of the take-up spindle when a tensile force of at least a predetermined value is applied to the take-up spindle and the take-up spindle is displaced in the direction perpendicular to the longitudinal central axis thereof; and a means for forcibly releasing the connection of the rotation preventing means to the base upon engagement of the ratchet means with the engaged portion.

Since the emergency locking retractors of the present invention are provided with a clutch mechanism releasing means, it is possible to release the clutch mechanism by pulling out the webbing even when the retractor has gone into a lockup state. The lockup state can hence be released easily. It is therefore possible to prevent the webbing from tightening the lap area of a restrained occupant.

BRIEF DESCRIPTION OF THE DRAWINGS

The above and other object, features and advantages of the present invention will become apparent from the following description and the appended claims, taken in conjunction with the accompanying drawings, in which:

DETAILED DESCRIPTION OF THE INVENTION AND PREFERRED EMBODIMENTS

In the drawings, like elements of structure are identified by like reference numerals.

Figures 1A, 1B:
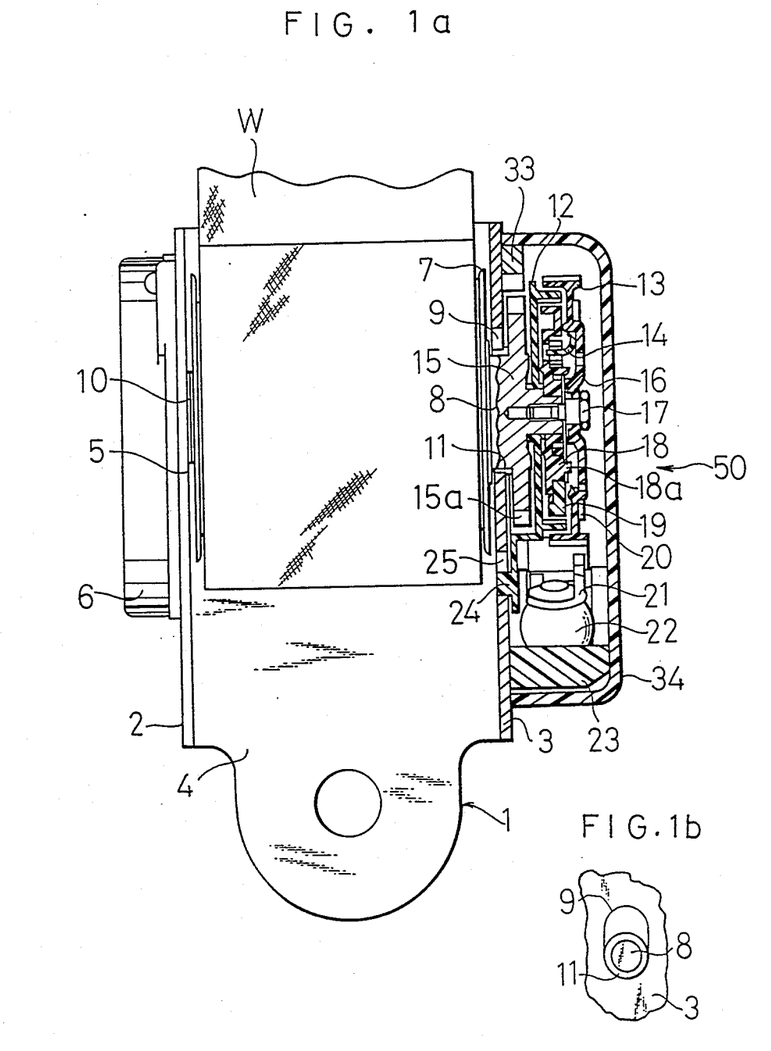
FIG. 1(a) is a partly cross-sectional side view of a retractor according to a first embodiment of this invention.
FIG. 1(b) is a front view showing details of a slot and its associated shaft.

The first embodiment of this invention will hereinafter be described with reference to FIGS. 1(a) and 1(b). As shown in FIG. 1(a), a base 1 of a retractor 50 has two side walls 2,3 extending in a substantially-parallel and opposed relation and a bottom wall 4 extending between the side walls 2,3. A take-up spindle 5 is rotatably supported between the side walls 2,3. The take-up spindle 5 is biased in a webbing-winding direction by means of an unillustrated take-up spring enclosed within a take-up spring cover 6. A shaft 8 extends through a bobbin 7. An inner end portion of a webbing W is fastened by an unillustrated stop stick in a groove portion formed axially in the bobbin 7 so that the webbing W is prevented from slipping off from the take-up spindle 5. The take-up spindle 5 extends through two slots 9 formed through the side walls 2,3 respectively (the slot in the side wall 2 is not shown in the drawing), whereby the take-up spindle 5 is supported for rotation. At both end portions of the take-up spindle 5 where the take-up spindle 5 is maintained in sliding contact with the inner peripheral edges of the corresponding slots 9, annular plastic bushes 10,11 are fit on the take-up spindle 5 so as to hold the shaft 8 of the take-up spindle 5. As appreciated from FIG. 1(b), each slot 9 extends in a direction perpendicular to the longitudinal axis of the take-up spindle 5, in other words, in both releasing and winding directions of the webbing W. Owing to this construction, the take-up spindle 5 can rotate in the slots 9 and is also displaceable in the extending direction of the slot 9. As will be described subsequently, the take-up spindle 5 is however maintained by an unillustrated spring or the like in a low part of each slot 9 as viewed in FIGS. 1a and 1b, when the retractor is in a state not locked.

On a right-hand outer end portion of the shaft 8 as viewed in FIG. 1(a), a latch plate 15 is provided as a ratchet means in such a way that the latch plate 15 may rotate together with the shaft 8. Plural teeth 15a are formed at equal intervals in the outer periphery of the latch plate 15.

Further outside the latch plate 15 on the shaft 8, a latch cup 12 as a movable member, flange 18 and lock arm 19 are provided are respectively. The latch cup 12 is loose-fit on the shaft 8, while the flange 18 is provided to rotate together with the shaft 8. The lock arm 19 is supported pivotally on a projection 18a of the flange 18 so that the lock arm 19 may swing in a predetermined range about the projection 18a. A ratchet wheel 13 is provided further outside the lock arm 19. Attachment of these members are effected by a plain washer 16, self-tapping screw 17 and the like. A friction spring 14 with one end portion thereof extending axially is provided on the inner wall of the ratchet wheel 13 so that the friction spring 14 may rotate together with the ratchet wheel 13 while retained as a unitary member under friction. Thus, the spring 14 normally causes the ratchet wheel 13 to rotate together with the flange 18, and consequently with the shaft 8. An annular inertia plate 20 is fixed on the outer wall of the ratchet wheel 13.

Provided fixedly on an upper part of the side wall 3 is a latch piece 33 having teeth which serve as an engaged portion and which are engageable with teeth 15a of the latch plate 15. A sensor case 23 is secured fixedly on a lower part of the side wall 3. A weight, namely, ball 22 is provided on the sensor case 23. Further, a sensor arm 21 is provided pivotally on the sensor case 23. The ball 22 is held loosely between a seat provided with the sensor case 23 and another seat provided with the sensor arm 21, so that the ball 22 is always in a state ready to function. A tip portion of the sensor arm 21, which tip portion is a free end portion of the sensor arm 21, is engageable with teeth formed in the outer periphery of the ratchet wheel 13. However, the tip portion of the sensor arm 21 and the teeth of the ratchet wheel 13 are normally maintained out of engagement. Incidentally, the latch plate 15 and latch piece 33 form a locking mechanism in combination. The above-described individual elements are all covered and protected by a case 34.

Figure 2:
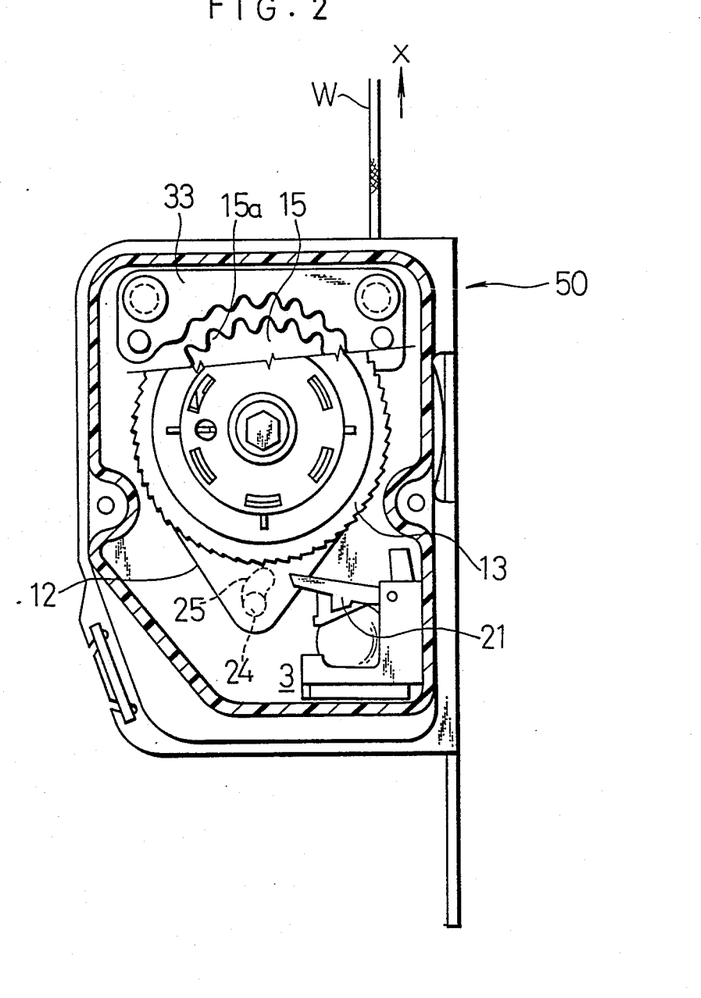
FIG. 2 is a front view of the retractor as viewed from the right-hand side in FIG. 1.

Reference is now had to FIG. 2. As also shown in FIG. 1, an axially-extending pin 24 is fixed on a pendant portion of the latch cup 12. The pin 24 is in engagement with a cam slot 25 formed through the side wall 3. The cam slot 25 is bent approximately at a mid point thereof and when viewed in the front view of FIG. 2, presents a shape resembling an open "V" turned over 90 degrees. As is envisaged from FIG. 2, the teeth 15a of the latch plate 15 are engageable with the teeth of the latch piece 33. As will be described subsequently, their engagement is achieved when the shaft 8 moves upwards, as viewed in FIG. 2, slidingly in the slot 9 of the side wall 3.

Details of a clutch mechanism of the present embodiment is now described with reference to FIG. 4. A plurality of teeth 12a are formed at equal intervals in the inner peripheral side wall of the latch cup 12. Inside the latch cup 12, the flange 18 and lock arm 19 are provided respectively in the manner already described above. An axially-extending end portion of the friction spring 14, which end portion is an opposite end portion to the above-described end portion maintained in contact with the inner wall of the plain washer 16, is hooked in a small hole formed through a pointed portion 19b of the lock arm 19. In addition, the lock arm 19 and flange 18 are connected together under a prescribed biasing force by means of a spring 26. An edge 19a of the lock arm 19 engages any one of the teeth 12a of the latch cup 12 when the clutch mechanism is actuated.

Figure 3:
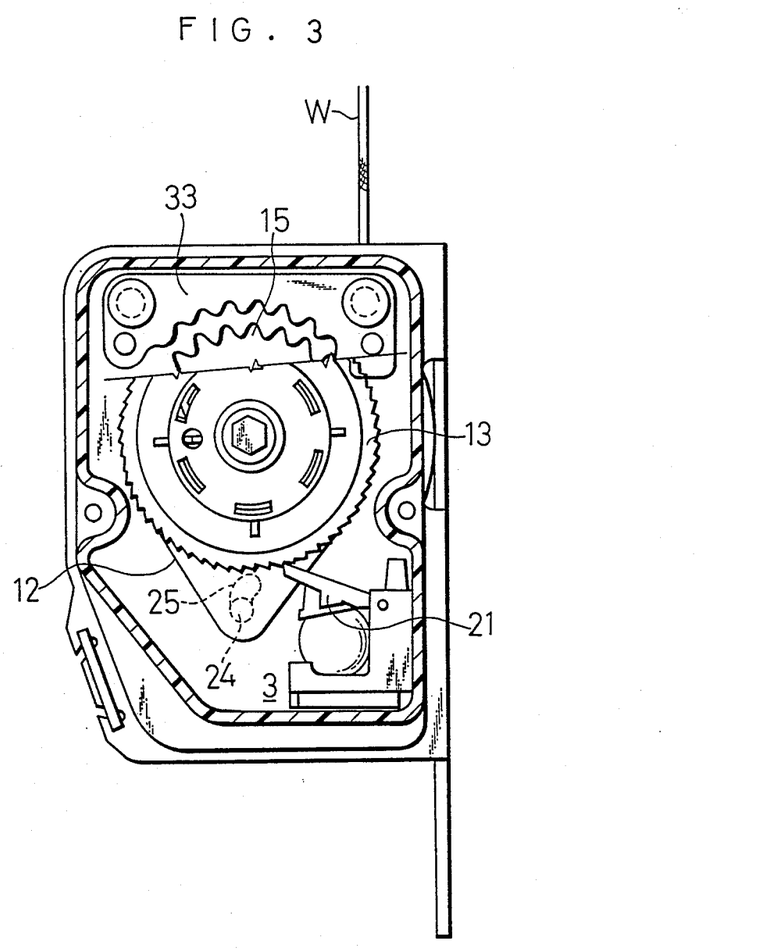
FIG. 3 is similar to FIG. 2 and shows the state of engagement between a sensor arm and a ratchet wheel.

The operation of the retractor according to the first embodiment will next be described specifically. When the ball 22 is caused to move in the event of a vehicle emergency and the sensor arm 21 is lifted (namely, the webbing W is pulled out), the tip portion of the sensor arm 21 is brought into engagement with one of the teeth of the ratchet wheel 13 so that the ratchet wheel 13 is stopped. This state is illustrated in FIG. 3. The friction spring 14, which is integral under friction with the ratchet wheel 13, thus serves to prevent the rotation of the lock arm 19.

Figure 4:
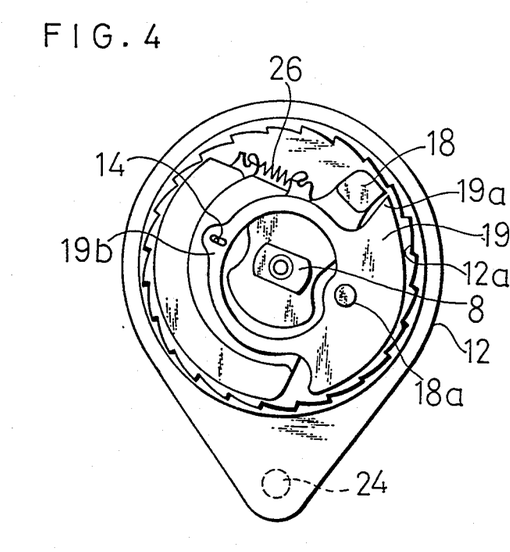
FIG. 4 shows a latch mechanism.
Figure 5:
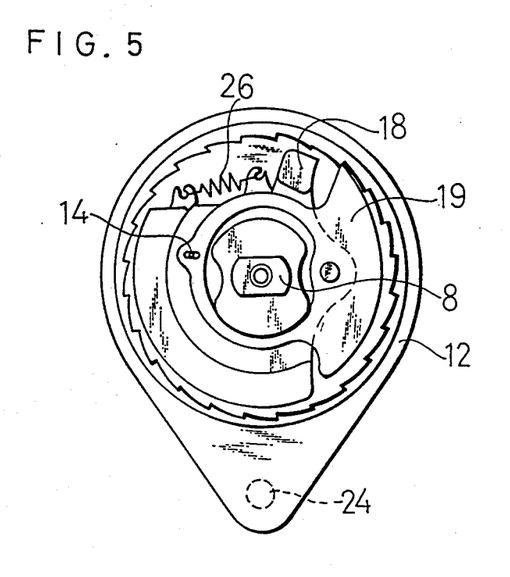
FIG. 5 is similar to FIG. 4 and illustrates the state of engagement between a lock arm and a latch cup.

When the shaft 8 rotates further, the state of the lock arm 19 changes from the state shown in FIG. 4 into that illustrated in FIG. 5, whereby the edge portion 19a of the lock arm 19 is brought into engagement with one of the teeth 12a of the latch cup 12. Since the pin 24 is in engagement with the cam slot 25 formed through the side wall 3, the pin 24 and cam slot 25 act as a holding means to restrain the latch cup 12 from undergoing any further rotation. As a consequence, the shaft 8 is prevented from any further rotation by the action of the latch cup 12, flange 18, lock arm 19, pin 24 and cam slot 25.

Let's now assume that an attempt is made to pull out the webbing W further from the above state, for example, in a direction indicated by an arrow X in FIG. 2, plastic bushes 10,11 biased downwardly by their corresponding unillustrated springs begin to move straight upward, as viewed in FIG. 1a, along the slot 9 of the side wall 3. Namely, the shaft 8 supported by the plastic bushes 10,11 also moves straight upward at the same time. As a result, the engagement between the tip portion of the sensor arm 21 and one of the teeth of the ratchet wheel 13 is released. At the same time, the pin 24 of the latch cup 12 also moves straight upward along the cam slot 25 of the side wall 3.

Figure 6:
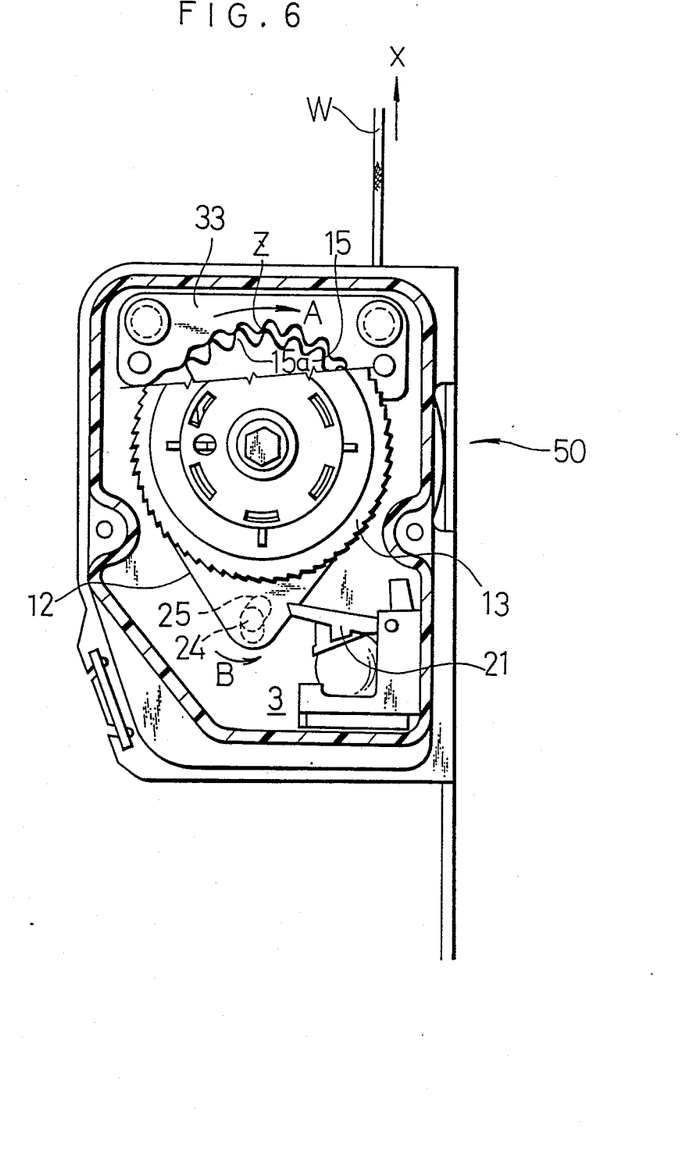
FIG. 6 illustrates a latch plate and a latch piece, which have begun to engage each other.

As envisaged from FIG. 6, the shaft 8 moves upwardly as viewed in the drawing when the webbing W is pulled in the direction indicated by the arrow X. As a result, the latch plate 15 starts engaging the latch piece 33. The teeth 15a of the latch plate 15 and those of the latch piece 33 are shaped in such a way that the latch plate 15 is turned in a direction indicated by an arrow A upon engagement of the teeth 15a of the latch plate 15 with tilted walls Z of the teeth of the latch piece 33. Therefore, the latch plate 15 turned in the direction A at this time. Since the pin 24 provided fixedly on the latch cup 12 moves concurrently along the cam slot 25 formed in the side wall 3, the latch cup 12 hence rotates as a whole in a direction indicated by an arrow B about the shaft 8.

Figure 7:
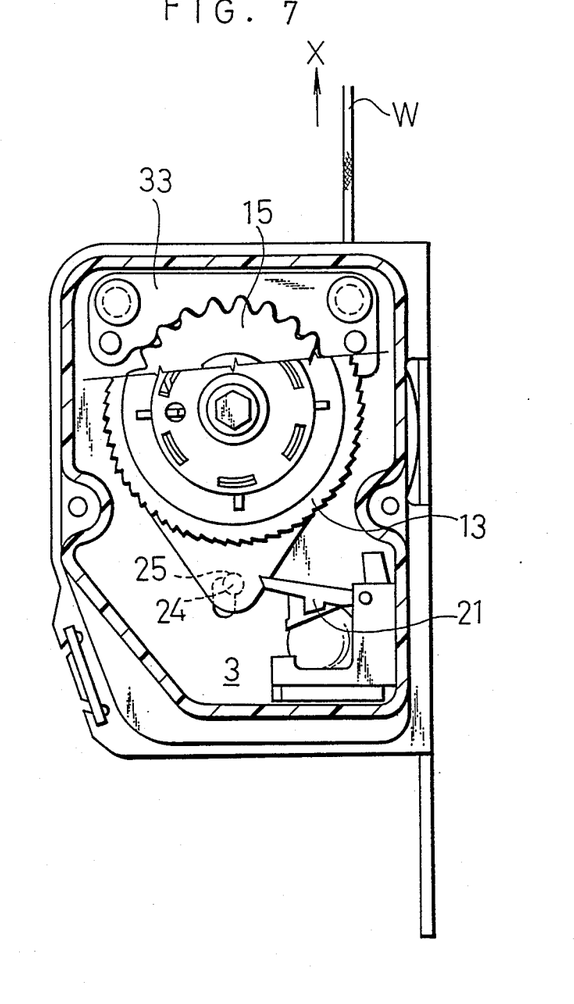
FIG. 7 depicts the latch plate and latch piece, which have been brought into complete engagement.

Reference is now had to FIG. 7. When the latch plate 15 and latch piece 33 have engaged completely with each other, the lock arm 19 and latch cup 13 are disengaged owing to the prevention of rotation of the take-up spindle in the state depicted in FIG. 6, the successive transmission of a force in the order of the shaft 8, lock arm 19 and latch cup 12 is stopped. On the other hand, the latch cup 12 supported rotatably on the take-up spindle is caused to turn in the direction B owing to the cam action between the pin 24 and the cam slot 25 of the tilted configuration when the take-up spindle moves upwards, whereby the lock arm 19 is released. Thus, the pin 24 and cam slot 25 act to forcibly release the clutch mechanism. Incidentally, the pin 24 of the latch cup 12 assumes a position at an upper end portion of the cam slot 25 while the latch plate 15 and latch piece 33 are in complete mutual engagement.

Through the course of operation mentioned above, the clutch mechanism of the retractor 50 has been released fully.

Figure 8:
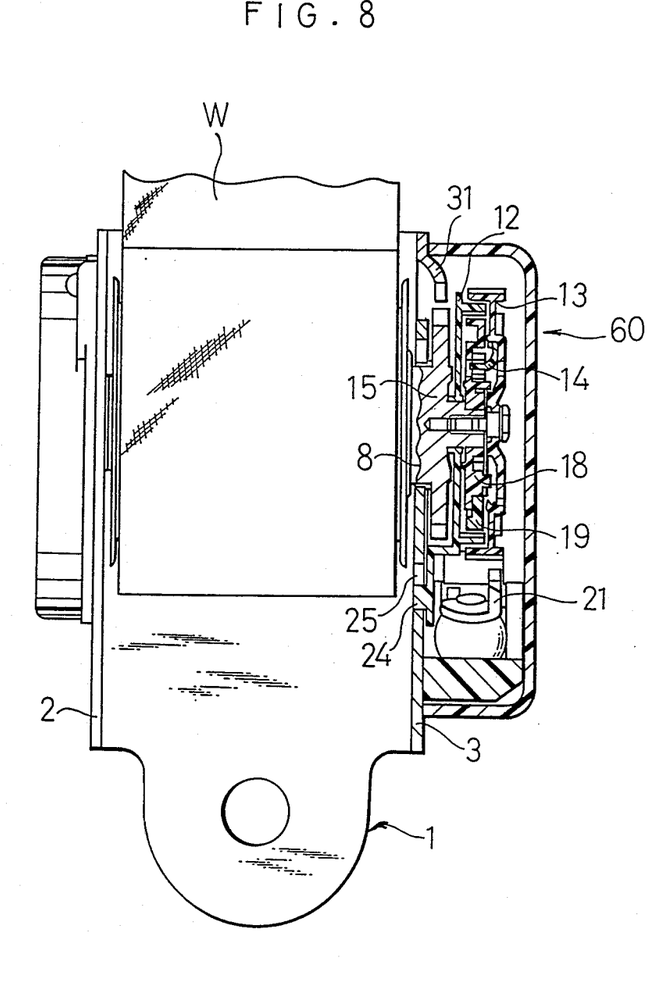
FIG. 8 is a partly cross-sectional side view of a retractor according to a modified embodiment of the first embodiment.
Figure 9:
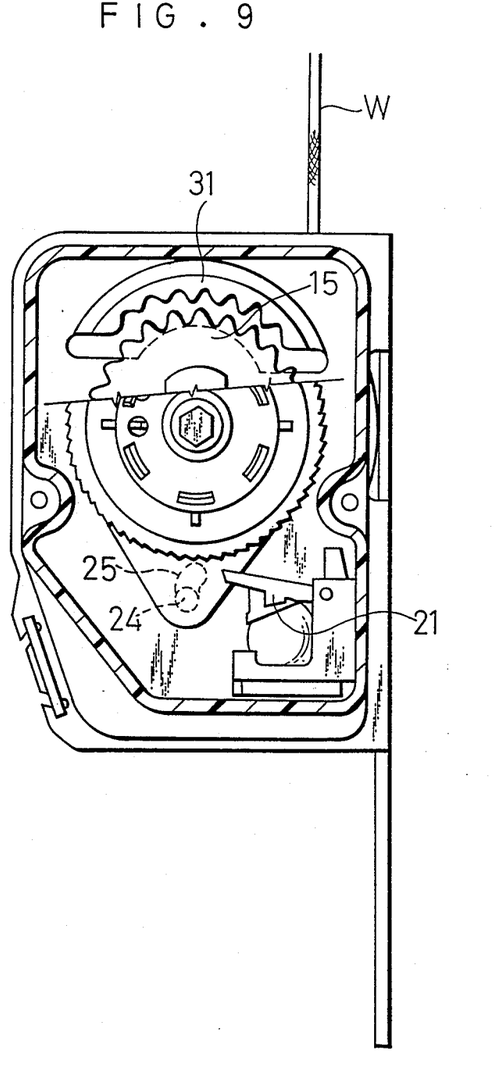
FIG. 9 is a front view of the retractor of FIG. 8 as viewed from the right-hand side in FIG. 8.

The above description has been made assuming that the retractor 50 is a vehicle-sensitive retractor. The above description however applies equally to a webbing-sensitive retractor. It should however be noted that in the case of such a webbing-sensitive retractor, the lock arm 19 and latch cup 12 are brought into mutual engagement by a phase difference to be developed between the shaft 8 and ratchet wheel 13 owing to an inertia force of the inertia plate 20. The subsequent operation is substantially equal to the vehicle-sensitive retractor except for the operation of the sensor arm 21. In a retractor 60 of the modified embodiment shown in FIGS. 8 and 9, a portion of an upper part of the side wall 3 of the base 1 is bent to a position where said portion is engageable with the latch plate 15, so that said portion forms a latch piece 31. Needless to say, the latch piece 31 is integral with the side wall 3.

Figure 10:
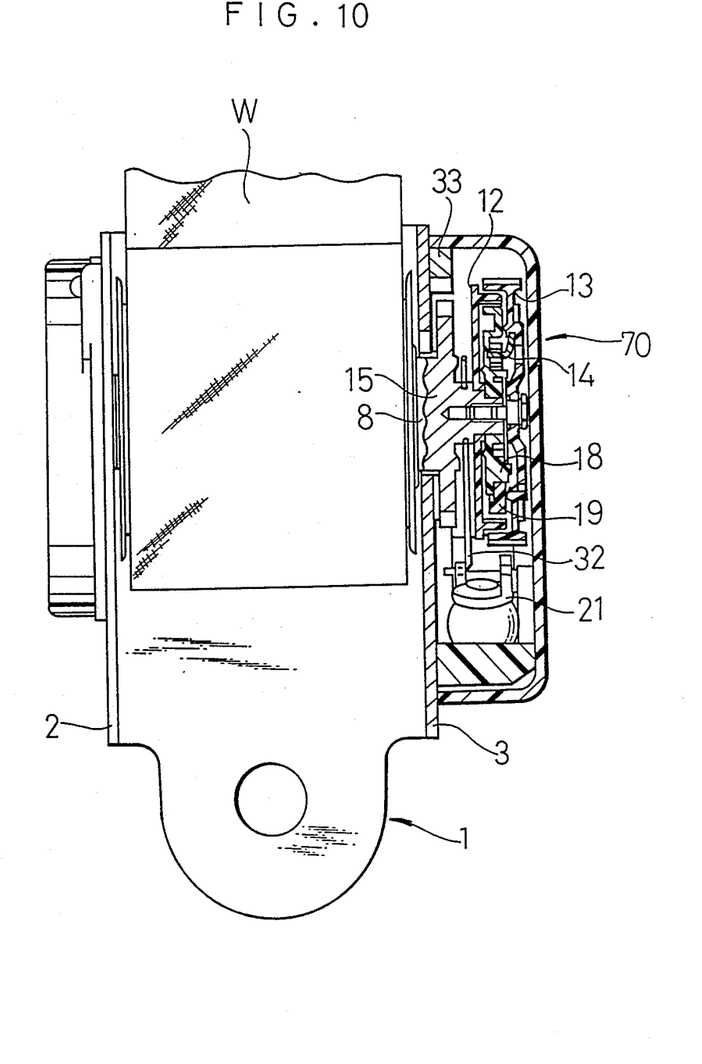
FIG. 10 is a partly cross-sectional side view of a retractor according to a second embodiment of this invention.
Figure 11:
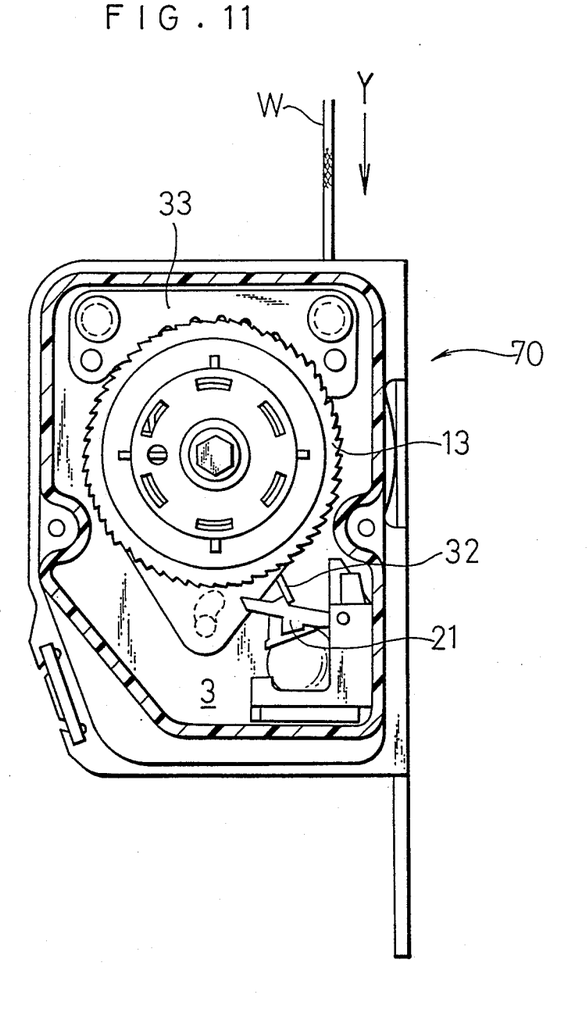
FIG. 11 is a front elevation of the retractor of FIG. 10 as viewed from the right-hand side in FIG. 10.
Figure 12:
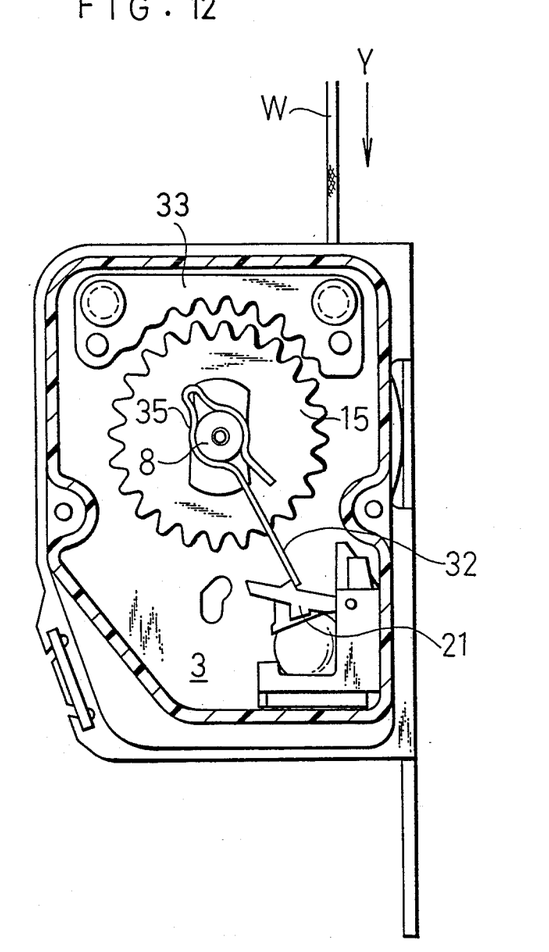
FIG. 12 shows an arm of FIG. 10, which is in a restraining position.
Figure 13:
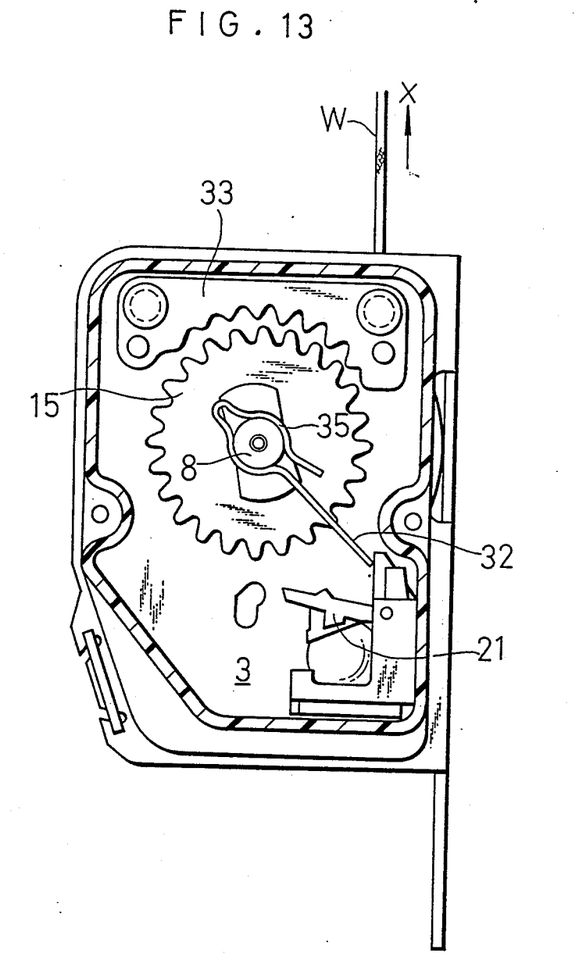
FIG. 13 depicts the arm of FIG. 10, which is in a free position.

The second embodiment of this invention will next be described. As is appreciated from FIGS. 10 and 11, a retractor 70 according to the second embodiment features that in addition to the elements of structure of the retractor 50 of the first embodiment, an arm 32 is provided on the shaft 8 by making use of friction. The arm 32 is provided to limit movements of the sensor arm 21 which take place by vibrations. As shown in FIG. 12, the arm 32 is fit on the shaft 8 at a clip portion 35 thereof so that the arm 32 is maintained in frictional contact with the shaft 8. When the shaft 8 rotates in a direction in which the webbing W is taken up (i.e., the webbing is taken up in a direction indicated by an arrow Y), the arm 32 assumes a position in which the sensor arm 21 is restrained by the arm 32. As illustrated in FIG. 13, when the shaft 8 rotates in a direction in which the webbing W is pulled out (i.e., the webbing is pulled out in the direction X), the arm 32 assumes a position in which the sensor arm 21 is freed from the arm 32. This construction is effective in enhancing the sureness of operation of the sensor arm 21 compared with the construction of the first embodiment.

Having now fully described the invention, it will be apparent to one of ordinary skill in the art that many changes and modifications can be made thereto without departing from the spirit or scope of the invention as set forth herein.

I claim:

1. An emergency locking retractor comprising:
a base having an engaged portion;
a take-up spindle supported rotatably and displaceably in a direction perpendicular to the longitudinal central axis thereof on the base, said spindle being biased in a webbing-winding direction;
a movable member supported rotatably about the take-up spindle;
a holding means for normally holding the movable member unrotatably;
a clutch mechanism for connecting the take-up spindle and movable member to each other when the take-up spindle undergoes a rotational speed change of at least a predetermined value;
a ratchet means provided as a unitary member with the take-up spindle, said ratchet means being engageable with the engaged portion to prevent any further rotation of the take-up spindle when a tensile force of at least a predetermined value is applied to the take-up spindle and the take-up spindle is displaced in the direction perpendicular to the longitudinal central axis thereof; and
a clutch mechanism releasing means for causing the movable member to turn in a webbing-releasing direction when the ratchet means and engaged portion are in mutual engagement.

2. The emergency locking retractor as claimed in claim 1, wherein the releasing mechanism is composed of a cam means and a contact member, the cam means is formed obliquely relative to the webbing-releasing direction in the base so as to be closer to the longitudinal central axis of the take-up spindle, and the contact member is formed on the movable member and can contact the cam means.

3. The emergency locking retractor as claimed in claim 2, wherein the cam means is a cam slot and the contact member is a pin received in the slot.

4. The emergency locking retractor as claimed in claim 1, further comprising a forcibly turning means for causing the take-up spindle to turn in the webbing-winding direction upon engagement of the ratchet means with the engaged portion.

5. The emergency locking retractor as claimed in claim 4, wherein the forcibly turning means is an engagement face formed in the engaged portion and tilted in the webbing-winding direction.

6. The emergency locking retractor as claimed in claim 1, wherein the holding means comprises a slot and a pin, the slot is formed in the base and extends substantially in a radial direction relative to the longitudinal central axis of the take-up spindle, and the pin is formed on the movable member and received in the slot.

7. The emergency locking retractor as claimed in claim 1, wherein the clutch mechanism comprises an inertia wheel loose-fit on the take-up spindle and a lock arm supported on the take-up spindle, and the lock arm engages the movable member when a rotational phase difference occurs between the inertia wheel and the take-up spindle.

8. The emergency locking retractor as claimed in claim 7, wherein the lock arm is supported eccentrically relative to the longitudinal central axis of the take-up spindle and the inertia wheel is connected to the arm by virtue of a frictional force.

9. An emergency locking retractor comprising:
a base having an engaged portion;
a take-up spindle supported rotatably and displaceably in a direction perpendicular to the longitudinal central axis thereof on the base, said spindle being biased in a webbing-winding direction;
a movable member supported rotatably about the take-up spindle;
a holding means for normally holding the movable member unrotatably;
a ratchet wheel which is loose-fit on the take-up spindle but is normally rotatable together with the take-up spindle;
a sensor means operable upon sensing a speed change of at least a predetermined value applied to the base, thereby engaging the ratchet wheel to prevent any further rotation of the ratchet wheel;
a clutch mechanism for connecting the take-up spindle and movable member to each other when a rotational phase difference occurs between the ratchet wheel and the take-up spindle;
a ratchet means provided as a unitary member with the take-up spindle, said ratchet means being engageable with the engaged portion to prevent any further rotation of the take-up spindle when a tensile force of at least a predetermined value is applied to the take-up spindle and the take-up spindle is displaced in the direction perpendicular to the longitudinal central axis thereof; and a clutch mechanism releasing means for causing the movable member to turn in a webbing-releasing direction when the ratchet means and engaged portion are in mutual engagement.

10. The emergency locking retractor as claimed in claim 9, wherein the releasing mechanism is composed of a cam means and a contact member, the cam means is formed obliquely relative to the webbing-releasing direction in the base so as to be closer to the longitudinal central axis of the take-up spindle, and the contact member is formed on the movable member and can contact the cam means.

11. The emergency locking retractor as claimed in claim 10, wherein the cam means is a cam slot and the contact member is a pin received in the slot.

12. The emergency locking retractor as claimed in claim 9, further comprising a forcibly turning means for causing the take-up spindle to turn in the webbing-winding direction upon engagement of the ratchet means with the engaged portion.

13. The emergency locking retractor as claimed in claim 12, wherein the forcibly turning means is an engagement face formed in the engaged portion and tilted in the webbing-winding direction.

14. The emergency locking retractor as claimed in claim 9, wherein the holding means comprises a slot and a pin, the slot is formed in the base and extends substantially in a radial direction relative to the longitudinal central axis of the take-up spindle, and the pin is formed on the movable member and received in the slot.

15. The emergency locking retractor as claimed in claim 9, wherein the clutch mechanism comprises a lock arm supported on the take-up spindle and engageable with the movable member when a rotational phase difference occurs between the ratchet wheel and the take-up spindle.

16. The emergency locking retractor as claimed in claim 15, wherein the lock arm is supported eccentrically relative to the longitudinal central axis of the take-up spindle and the ratchet wheel is connected to the arm by virtue of a frictional force.

17. The emergency locking retractor as claimed in claim 9, further comprising a holding member connected to the take-up spindle by virtue of a frictional force, and when the take-up spindle turns in the webbing-winding direction, said holding member being brought into engagement with the sensor means to hold the sensor means in an inoperative state.

18. An emergency locking retractor comprising:
a base having an engaged portion;
a take-up spindle supported rotatably and displaceably in a direction perpendicular to the longitudinal central axis thereof on the base, said spindle being biased in a webbing-winding direction;
a wheel loose-fit on the take-up spindle;
a means for causing the wheel to rotate together with the take-up spindle normally;
a rotation preventing means adapted to be connected to the base when a rotational phase difference occurs between the take-up spindle and the wheel, whereby any further rotation of the take-up spindle is prevented;
a ratchet means provided as a unitary member with the take-up spindle, said ratchet means being engageable with the engaged portion to prevent any further rotation of the take-up spindle when a tensile force of at least a predetermined value is applied to the take-up spindle and the take-up spindle is displaced in the direction perpendicular to the longitudinal central axis thereof; and
a means for forcibly releasing the connection of the rotation preventing means to the base upon engagement of the ratchet means with the engaged portion.

19. The emergency locking retractor as claimed in claim 18, wherein the rotation preventing means comprises a ratchet plate and a lock arm, the ratchet plate is normally held unrotatably about the take-up spindle and defines teeth, and the lock arm is supported on the take-up spindle and is engageable with any one of the teeth of the ratchet plate when a rotational phase difference occurs between the take-up spindle and the wheel.

20. The emergency locking retractor as claimed in claim 19, wherein the forcibly releasing means causes the ratchet plate to turn in a webbing-releasing direction so that the connection between the ratchet plate and the lock arm is released.

* * * * *